S. F. WALKER.
SPRING WHEEL.
APPLICATION FILED FEB. 16, 1916.
1,234,832.
Patented July 31, 1917.
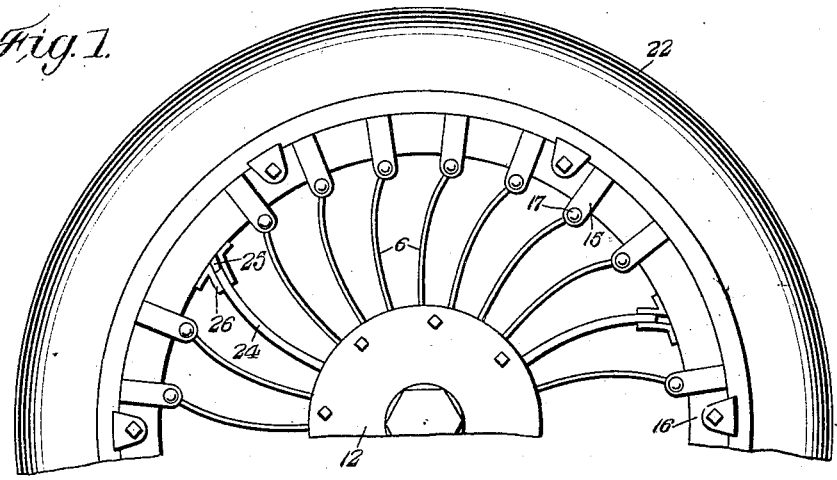
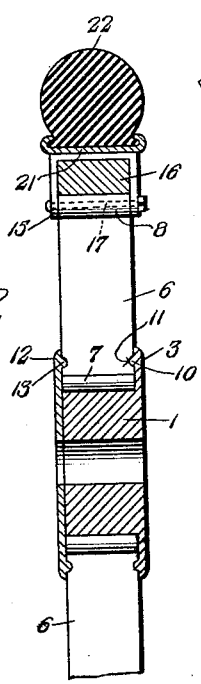
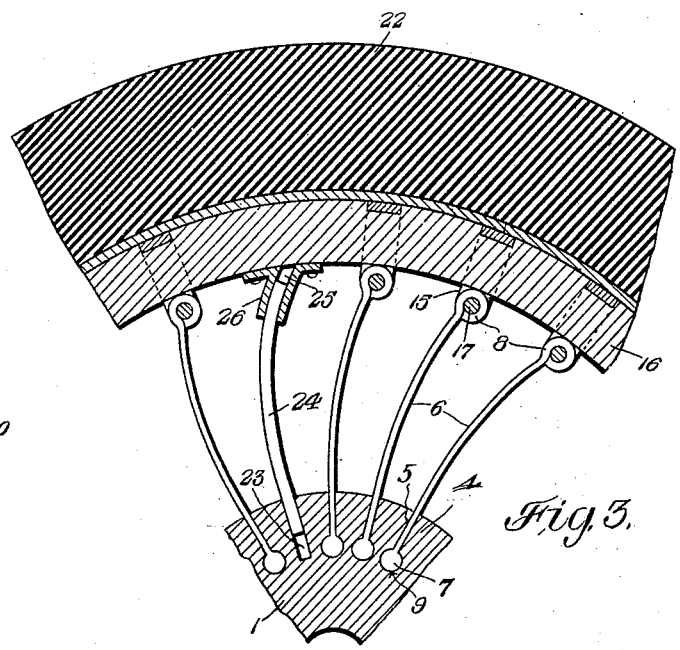
Inventor
S. F. Walker,
By Victor J. Evans
Attorney
Witnesses
J. H. Crawford

UNITED STATES PATENT OFFICE.

SAMUEL F. WALKER, OF BOZEMAN, MONTANA.

SPRING-WHEEL.

1,234,832.　　　　　Specification of Letters Patent.　　Patented July 31, 1917.

Application filed February 16, 1916.　Serial No. 78,689.

*To all whom it may concern:*

Be it known that I, SAMUEL F. WALKER, a citizen of the United States, residing at Bozeman, in the county of Gallatin and State of Montana, have invented new and useful Improvements in Spring-Wheels, of which the following is a specification.

This invention relates to vehicle wheels and more particularly to spring wheels.

One of the principal objects of the invention is to provide a wheel which will have maximum traction qualities as well as maximum resiliency and further to provide a wheel which is simple in construction, which will effectively take the place of pneumatically tired wheels.

Further objects of the invention will appear as the following specific description is read in connection with the accompanying drawing which forms a part of this application, and in which:—

Figure 1 is a detail side elevation, showing a portion of the wheel embodying my invention.

Fig. 2 is a transverse sectional view taken therethrough.

Fig. 3 is a detail longitudinal section taken at right angles to Fig. 2 and with the clamping plate removed to show the construction of the hub.

In the specific embodiment of the invention, 1 represents the inner portion of the hub which is secured directly to the axle and has adapted thereto the annular flange 3 and the radiating ribs 4 between which are formed the grooves 5 open at the outer ends of the ribs so as to permit of the insertion of the spokes 6. The spokes 6 are constructed of arcuate sections of spring steel formed at one end with the enlargement 7 and at the opposite end with eye 8, the former being received in cored out portions of the hub indicated at 9 and communicating with the grooves 5. The interior portion of the flange 3, as shown, is provided with a rib 10, annular in outline and arranged to be received at a notch 11 formed in the edges of the spokes.

The spokes are held in proper position in the hub by a clamping plate 12, also provided with an annular rib 13 arranged to engage notches 14 in the opposite sides of the spoke. These spokes are all arranged at intervals throughout the circumference of the hub and have their eyes 8 positioned between the legs of suitable stirrup members 15 secured to the felly 16. The ends of the spokes are held in the stirrup members by means of bolts 17 which pass through the legs of the stirrup and through the eye and are held against displacement by the usual rim 21. The rim which is shown at 21 may be of any suitable construction and the tire indicated at 22 is preferably of the solid or cushion variety as distinguished from the inflated casing or pneumatic tire.

As shown, certain of the grooves specifically indicated at 23 are made considerably wider than others so as to receive what will hereinafter be termed traction spokes 24. These traction spokes are made relatively heavy and consequently, relatively stiff and have their free terminals received in recesses 25 formed in brackets 26 secured to the felly. The free ends of the traction spokes 24 are never compressed to such an extent that they engage the bottom of the recesses 25 and work freely in the recesses so as to give the wheel its maximum resiliency, while the stiffness of the spokes provides for maximum tractive capacity. Three of these spokes only are provided as to include more than three in a wheel would be to get two of them horizontal at the same time and thus nullify the resiliency of the spring spokes 6. Thus it will be seen that I have provided a wheel with a sufficient number of resilient spokes to give the wheel the proper life while there are a number, no more than is necessary, of relatively stiff spokes which prevent relative circumferential movement between the rim and the hub and thereby insure maximum tractive qualities.

What is claimed is:—

A spring wheel including a hub formed with recesses enlarged at their inner ends, spring spokes having terminals formed to coöperate with the recesses and adapted to be engaged with the latter by laterally sliding movements of the parts, the outer ends of said spring having pivotal connection with the felly, and traction spokes having their inner ends seated in recesses in the hub and terminating short of the bottom of said recesses, and brackets secured to the felly and slidably receiving the outer ends of the traction spokes.

In testimony whereof I affix my signature in presence of two witnesses.

SAMUEL F. WALKER.

Witnesses:
 FRED SCHULTZ,
 JOHN W. DAVIS.

Copies of this patent may be obtained for five cents each, by addressing the "Commissioner of Patents, Washington, D. C."